(12) United States Patent
Hogie et al.

(10) Patent No.: US 6,237,325 B1
(45) Date of Patent: May 29, 2001

(54) BYPASS TURBOJET-ENGINE COWLING COMPRISING AN ELECTRICALLY GROUNDED DISPLACEABLE COMPONENT

(75) Inventors: Jean-Paul René André Hogie; Guy Bernard Vauchel, both of Le Havre (FR)

(73) Assignee: Hispano-Suiza Aerostructures (FR)

( * ) Notice: Subject to any disclaimer, the term of this patent is extended or adjusted under 35 U.S.C. 154(b) by 0 days.

(21) Appl. No.: 09/387,778

(22) Filed: Sep. 1, 1999

(30) Foreign Application Priority Data

Sep. 3, 1998 (FR) .................................................. 98 11004

(51) Int. Cl.[7] .................................................. F02K 3/02
(52) U.S. Cl. ........................................ 60/226.2; 60/39.091
(58) Field of Search ............................... 60/226.2, 39.091

(56) References Cited

U.S. PATENT DOCUMENTS 3,500,645    3/1970   Hom .
5,548,954 *  8/1996   De Cambray et al. ............. 60/226.2
6,026,638 *  2/2000   Gonidec et al. .................... 60/226.2

FOREIGN PATENT DOCUMENTS

| 2207805 | 12/1997 | (CA) . |
| 0109219 A2 | 5/1984 | (EP) . |
| 1482538 | 4/1967 | (FR) . |
| 2578293 | 9/1986 | (FR) . |

* cited by examiner

Primary Examiner—Charles G. Freay
(74) Attorney, Agent, or Firm—Bacon & Thomas PLLC

(57) ABSTRACT

A turbojet-engine cowling combined with a thrust reverser comprising a large-displacement displaceable component (7) includes an electrically grounding mechanism for the displaceable component (7) when in its forward-thrust position. The grounding mechanism comprises an elastic device (20) dedicated to shunt the electric current away from any mechanical member used in the displacement without any displaceable connecting element.

19 Claims, 4 Drawing Sheets

BYPASS TURBOJET-ENGINE COWLING COMPRISING AN ELECTRICALLY GROUNDED DISPLACEABLE COMPONENT

BACKGROUND OF THE INVENTION

1. Field of the Invention

The present invention relates to a bypass turbojet-engine cowling equipped with a thrust reverser comprising an electrically grounded displaceable component.

2. Description of the Related Art

As regards a bypass turbojet engine, it is known to fit the engine with a duct at the rear of the fan in order to channel the so-called cold, bypass flow. This duct comprises an inner wall enclosing the actual engine structure at the rear of the fan and an outer wall with an upstream portion continuous with the engine casing enclosing the fan. This outer wall is able to channel simultaneously the bypass flow and the primary flow at its downstream portion, namely to the rear of the exhaust of the primary, so-called hot flow in the case of a mixed-flow cowling for instance, or to channel only the bypass flow in the case of so-called separate-flow pods.

A wall furthermore may fair the engine outside, that is the outside of the casing enclosing the fan and the outside of the outer wall of the above discussed duct, in order to minimize powerplant drag. This applies especially to powerplants assembled to the aircraft's exterior, in particular when such powerplants are attached under the wings or affixed to the rear of the fuselage.

The thrust reverser relating to the present invention which provides flow deflection to generate thrust reversal is known per se and may be of the door/flap-type or of the cascade-type.

FIG. 1 of the attached drawings shows a known design of a so-called cascade-type thrust reverser used in a bypass turbojet engine wherein a rear portion of a cowling 7—which in the forward-thrust mode of the turbojet engine forms all or part of the downstream end of the outer wall of the annular duct of the bypass flow—is displaceable in slides in the downstream direction by a control system, illustratively a number of linear actuators affixed on an upstream portion of the thrust reverser. The rear cowling displacement causes a plurality of flaps 3 to pivot in order to seal the duct and to deflect the bypass flow into a reversed flow. The reversed flow is guided by a set of cascades 6 which are configured on an outer periphery of the duct and which, following the downstream displacement of the rear portion of the cowling 7, will be exposed.

Illustrative designs of these thrust reversers are found in European patent document A 0,109,219 and U.S. Pat. No. 3,500,645.

FIG. 2 of the attached drawings shows a known design of a door-type thrust reverser for a bypass turbojet engine wherein a plurality of doors 10, which form part of the outer wall, are driven to open a passage across the outer wall and to shut the annular duct rearwardly of the passage such that the bypass flow is guided outward towards the front of the cowling. Illustrative designs of such thrust reversers are found in French patent 1,482,538.

The displaceable parts, the door 10 or the rear portion of the cowling 7 in the above examples, are connected to a stationary portion of the cowling structure by intermediate components which may be swivels, when the displaceable part is driven into rotation, or may be a slide/slider assembly, in the case where the displaceable part is driven into translation.

In general, lubricants are prohibited anywhere on the cowling. In order to obtain a low coefficient of friction and to avoid eventual seizure of the intermediate components, a plastic cladding is placed at the contacting interfaces of the intermediate components.

This cladding electrically insulates the displaceable part from the remaining cowling structure.

Accordingly, in case of lightning, an arc striking the displaceable part cannot propagate unhampered toward the stationary structure which is connected to the grounding mass of the aircraft.

Several adverse effects which degrade structural reliability will thus result from a lightning strike. There being little assurance of conductance, or none, the current from the lightning strike will cause intense heating, in particular at the site of impact, thereby severely damaging the structure. The lightning current will flow and cause sparking at the interfaces of the intermediary components, damaging the plastic cladding and possibly wholly destroying it, thereby degrading the control of the displaceable parts.

Conventionally, electrical grounding is carried out to ensure electrical continuity. The displaceable and stationary components are connected by a braid which allows relative motion. This technique is well suited for limited lengths and specific orientations and preservation of a flexible connection; however, it introduces at least two operational constraints:

- If the relative displacement is large, for instance in a cascade thrust reverser wherein the rear portion of the cowling is driven more than 500 mm, the flexible connection no longer fits; that is, the required displacement of this magnitude no longer allows proper housing of the braid; moreover the overall structural bulk is substantially degraded;
- In case of lightning, the braid is subjected to substantial electrodynamic stresses in the form of a whip action on the braid which is magnified by the substantial length of this flexible connection; this whip action may unacceptably damage the braid per se as well as the adjoining structure.

SUMMARY OF THE INVENTION

One to the objectives of the invention is to propose a physical mechanism providing electrical continuity between two relatively displaceable components which are subjected to a large displacement, being advantageously situated in a streamline or in the forward-thrust mode, and being insulated at the drive interfaces.

A cowling of a bypass turbojet engine which includes a thrust reverser comprising a large-displacement displaceable component and meets the requirements of the invention is characterized in that it includes an electrically grounding mechanism which comprises a dedicated elastic device which shunts the electric current around any mechanical member implementing the displacement without having any displaceable connection device.

Advantageously, the electrically grounding component is positioned in such a manner so as to reduce the distance required to ground the displaceable cowling portion or the thrust reverser door. Moreover the specification of the grounding mechanism circumvents weight disadvantages.

BRIEF DESCRIPTION OF THE DRAWINGS

Other features and advantages of the invention are elucidated in the following description of preferred embodiments of the invention, with reference to the attached drawings, in which.

DETAILED DESCRIPTION OF THE PREFERRED EMBODIMENTS

The invention relates to a bypass turbojet-engine cowling which allows using structural elements of the extant cowling in order to install at the site deemed most suitable an elastic contact mechanism which shall be compressed in the closing direction of a displaceable component.

Figure 1:
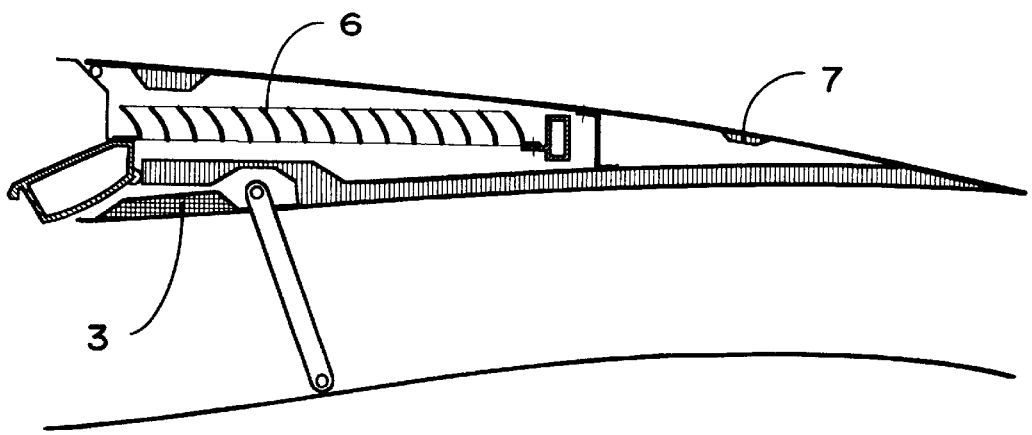
FIG. 1 is a sectional view of a longitudinal section in a plane through the axis of rotation of a turbojet engine of a known cascade-type thrust reverser in its closed position.
Figure 2:
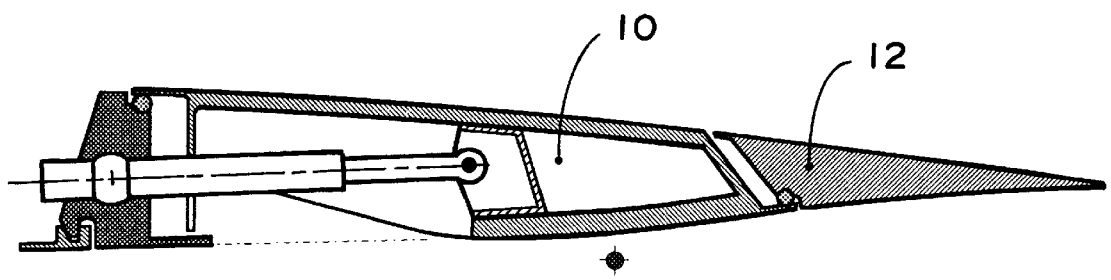
FIG. 2 is a sectional view of a longitudinal section in a plane through the axis of rotation of a turbojet engine of a known door-type thrust reverser in its closed position.
Figure 3:
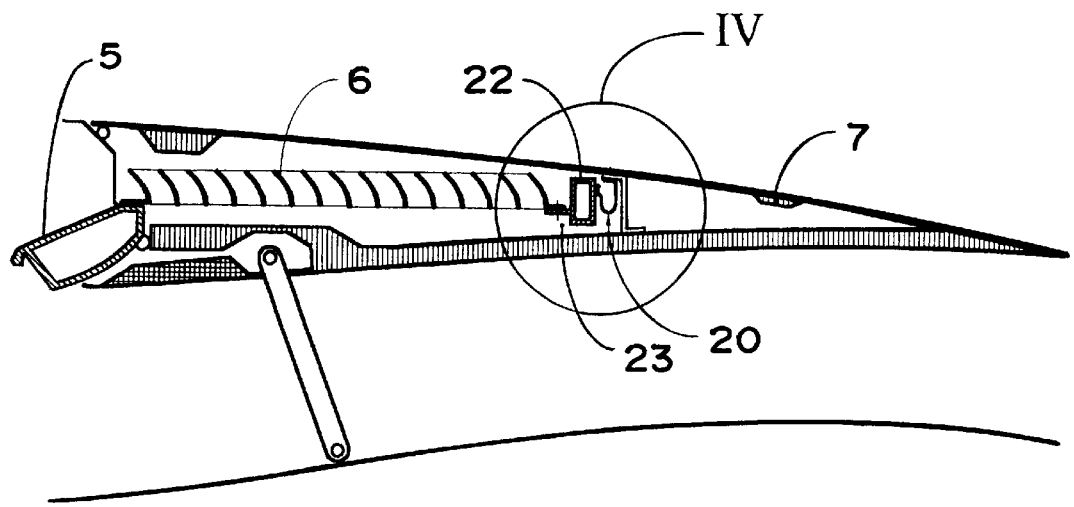
FIG. 3 is a view similar to FIG. 1 of a cascade-type thrust reverser in the forward-thrust position of an embodiment of the invention.
Figure 4:
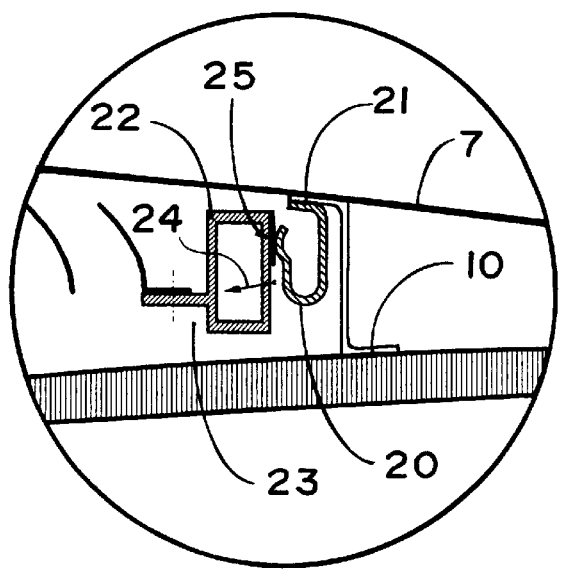
FIG. 4 is an enlarged view of the detail IV of FIG. 3.

In an embodiment of the invention shown in FIGS. 3 and 4, a cross-sectionally shaped leaf spring 20 is mounted on an internal part of the displaceable, rear portion of the cowling 7 of a cascade-type thrust-reverser 6.

In the embodiment shown in the forward-thrust mode in FIGS. 3 and 4, a vertical structure 17 bracing the displaceable rear portion of the cowling 7 is located near a downstream ring 22 of the stationary structure 5 supporting the cascades 6. An interface 25 ensuring good wear resistance may be inserted between the leaf spring 20 and the component contacting the stationary structure, here ring 22.

Depending on the material used and/or the surface protection of the structural components, the width of the contact mechanism will be specified with respect to at least three contacting affixations to the outer cowling structure. These contacting affixations are either a direct contact with the cowling structure or the connection mechanism allowing appropriate transmission of lightning current.

The shape of the elastic contact mechanism, its material and orientation are highly important operational parameters.

The shape must provide reliable and maintained contact by endowing the contact mechanism with a matched displacement.

The contact made by the leaf spring 20 must remain ensured even when the main lock ruptures. The configuration of the operating secondary lock assumes a slight withdrawal of the rear portion of the cowling 7, the displacement differential being secured by the matching displacement of the leaf spring 20.

The material employed should be a very good conductor and also be elastic, for instance beryllium bronze.

The shape and orientation should also provide an increase in contacting pressure when there is an electric current. For example the electric current will produce an electrodynamic force which biases the leaf spring 20 to unfold in the direction of the arrow 24. By making the unfolding direction 24 go toward the component contacting the stationary receiving part, the contacting pressure is increased and thus improves conductivity.

The support ring 22 for the cascades is connected directly to the outer thrust-reverser structure. Advantageously, it is affixed to the structure bearing the thrust reverser, that is a beam 23. The beam 23 suspends the thrust reverser from the aircraft by hinges. These hinges mainly ensure electrical continuity because the hinging material is not surface treated. Moreover, the tight component tolerance and the contact implemented by the weight of the structure makes it a preferred path to dissipate any excess electric charge.

The contact mechanism may be situated longitudinally anywhere along the cowling structure; however, preferably it shall be situated as close as possible to the outer structure. If there are electrical discontinuities at the displaceable rear portion of the cowling 7, several contact mechanisms may be put in place peripherally where deemed appropriate by the expert.

Conventionally a thrust reverser comprises two kinds of hinges, namely the so-called floating ones and the so-called fixed ones. They are meant to preclude stray torques from being introduced into the cowling structure. The thrust reverser takes precedence in being centered by its front structure around the engine.

The hinges near this installation are floating, that is, the two hinges opposite the thrust-reverser's half structures are connected to each other by a single linkrod absorbing circumferential stresses. The linkrod is freely mounted and without contact with the aircraft's bearing structure.

In general, a single hinge, remote from the thrust-reverser's affixation to the engine, is fixed, that is, it is actually affixed to a stationary support which is part of the aircraft's bearing structure.

It is alignment with this fixed hinge that is preferentially sought after. The aim is to minimize the current shunting path, hence the usefulness of this design.

As regards a cascade-type thrust reverser, the fixed hinge is situated near the ring 22 supporting the cascades 6, which is the preferred choice for placement.

Figure 5:
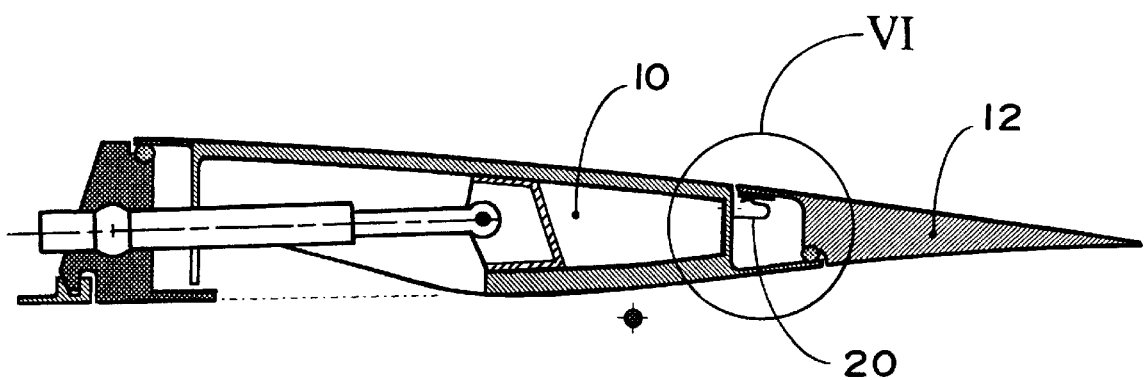
FIG. 5 is a view similar to FIG. 1 of a door-type thrust reverser in the forward thrust-position of an embodiment of the invention.
Figure 6:
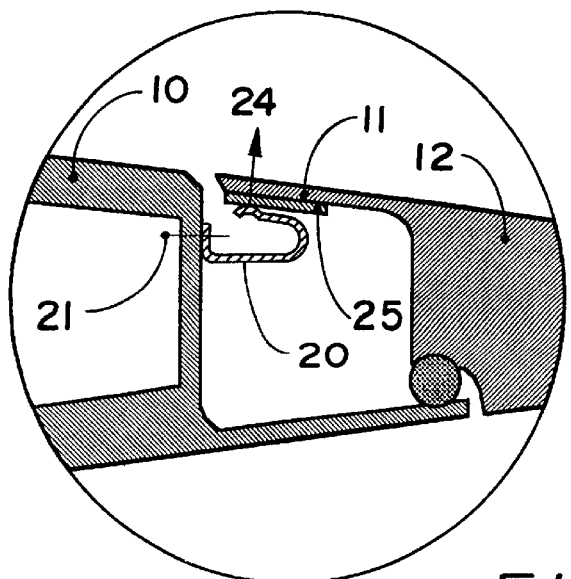
FIG. 6 is an enlarged view of the detail VI of FIG. 5.

With respect to a door-type thrust reverser, FIGS. 5 and 6 show the preferred position ensuring an optimal path toward the fixed hinge, the path being at the rear of the cowling as for the cascade-type thrust reverser.

In the forward-thrust mode, the rear structure of the door 10 covers internally an upstream structure II of the stationary rear cowling 12. A leaf spring 20 having the above defined properties is affixed to the rear of the structure of the door 10 in such manner that it will not interfere with the stationary upstream structure 11 when the door 10 is driven. The leaf spring 20 preferably makes contact with an inner side of the stationary upstream structure 11. If the material of the stationary structure 12 making contact with the leaf spring 20 is well conducting, a single wear-resistant strip may be inserted at the interface on the inner side of the stationary structure 12.

On the other hand, if the material of the stationary structure 12 at the interface with the leaf spring 20 is poorly conducting, a conducting strip interface 25 may be inserted on the inner side of the upstream structure 11.

This conducting strip interface 25 may form part of the periphery of the stationary rear cowling 12 and may simultaneously electrically ground several displaceable components. Also, the conducting strip interface 25 may be connected to the outer thrust-reverser structure by a matching connection, in this manner keeping all movable parts at the same potential as the remainder of the cowling structure.

Figure 7:
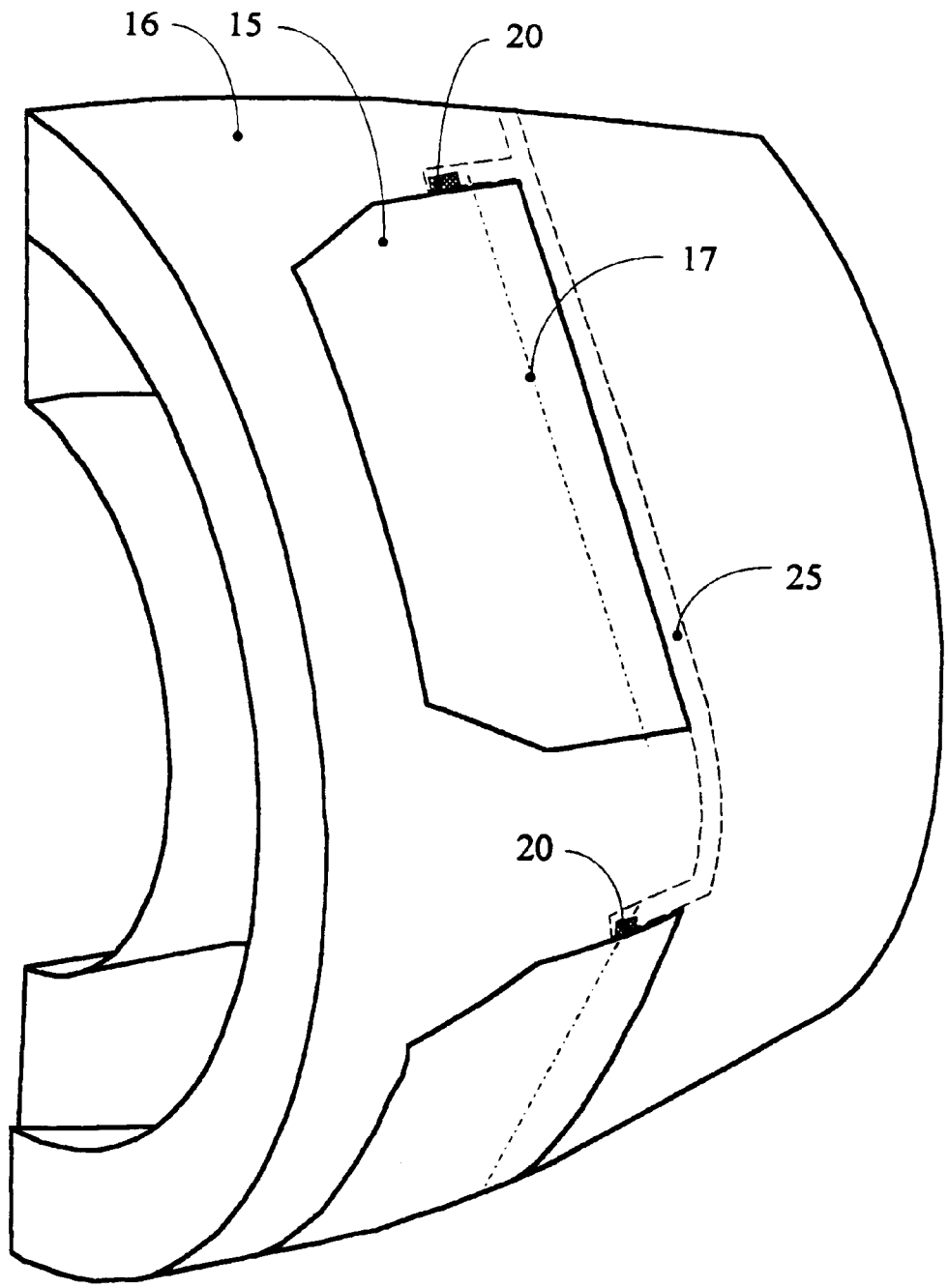
FIG. 7 is a perspective view of a scoop-door type thrust reverser in the forward-thrust position of an embodiment of the invention.

FIG. 7 shows the application of this matching connection to a thrust reverser of the kind disclosed in European patent document A 0,822,327. Because the structure of the door 15 runs centripetally rielative to the longitudinal cowling axis and because the rear of the door may slightly project beyond the outer pod structure, the preferred location of the installed leaf spring 20 is situated at a side portion of the structure of the door 15. The most appropriate longitudinal position is that which keeps the leaf spring 20 inside the stationary structure 16 in all operational thrust-reverser modes in order to avoid the need for any discontinuity in the outer surface of the stationary structure to allow leaf movement. This parameter therefore places the elastic contact mechanism in this embodiment upstream of a pivot 17 of the door 15.

Because the design of a scoop-door type thrust reverser places the pivots 17 of the doors 15 to the rear relative to the conventional door design, the elastic contact mechanism electrically grounding the displaceable components will remain near the site of the fixed hinge of the thrust reverser.

Electrical continuity between the doors 15 is implemented either directly by the material of the stationary structure 16 or by the conducting strip interface 25 disposed along the stationary structure 16 at the rear of the door 15 and connecting the two doors to the electrical cowling ground.

Obviously other sites are possible as well, for instance downstream of the structure of the door 15; however, local obstruction of the door's inner exhaust cross-section may reduce aerodynamic performance.

We claim:

1. A cowling for a bypass turbojet engine, comprising:
   a thrust reverser comprising at least one large-displacement displaceable component (7; 10); and
   a mechanism for electrically-rounding the at least one displaceable component (7; 10) comprising at least one elastic device (20) in contact with the at least one displaceable component when in a forward thrust position so as to shunt electric current away from any mechanical member used in displacement without any displaceable linking element.

2. A cowling for a bypass turbojet engine according to claim 1, wherein the elastic device (20) is arranged to be compressed by movement of the at least one displaceable component into the forward thrust position.

3. A cowling for a bypass turbojet engine according to claim 2, wherein the elastic device (20) comprises a leaf spring composed of electrically conductive material.

4. A cowling for a bypass turbojet engine according to claim 3, wherein the leaf spring (20) has a shape which ensures maintained contact with a stationary structure of the cowling when the displaceable component is in the forward-thrust position even if a primary locking mechanism of the displaceable component fails; and
   wherein the leaf spring (20) is configured and positioned such that the leaf spring (20) exerts an increased contacting pressure toward a contacting surface on the stationary structure of the cowling when an electrodynamic force is generated by an electric current in the leaf spring (20).

5. A cowling for a bypass turbojet engine according to claim 1, wherein the elastic device (20) is situated near a suspension zone of the thrust reverser.

6. A cowling for a bypass turbojet engine according to claim 2, wherein the elastic device (20) is situated near a suspension zone of the thrust reverser.

7. A cowling for a bypass turbojet engine according to claim 3, wherein the leaf spring (20) is situated near a suspension zone of the thrust reverser.

8. A cowling for a bypass turbojet engine according to claim 4, wherein the leaf spring (20) is situated near a suspension zone of the thrust reverser.

9. A cowling for a bypass turbojet engine according to claim 5, wherein the elastic device (20) is situated adjacent to a stationary hinge of the thrust reverser.

10. A cowling for a bypass turbojet engine according to claim 6, wherein the elastic device (20) is situated adjacent to a stationary hinge of the thrust reverser.

11. A cowling for a bypass turbojet engine according to claim 7, wherein the leaf spring (20) is situated adjacent to a stationary hinge of the thrust reverser.

12. A cowling for a bypass turbojet engine according to claim 8, wherein the leaf spring (20) is situated adjacent to a stationary hinge of the thrust reverser.

13. A cowling for a bypass turbojet engine according to claim 1, wherein the elastic device (20) is situated at a rear of the displaceable component (7; 10).

14. A cowling for a bypass turbojet engine according to claim 2, wherein the elastic device (20) is situated at a rear of the displaceable component (7; 10).

15. A cowling for a bypass turbojet engine according to claim 3, wherein the leaf spring (20) is situated at a rear of the displaceable component (7; 10).

16. A cowling for a bypass turbojet engine according to claim 4, wherein the leaf spring (20) is situated at a rear of the displaceable component (7; 10).

17. A cowling for a bypass turbojet engine according to claim 1, further comprising:
   an electrically conductive strip (25) fitted on a stationary structure of the cowling with which the elastic device (20) makes contact when the displaceable component is in the forward thrust position.

18. A cowling for a bypass turbojet engine according to claim 17, wherein the at least one displaceable component (7; 10) comprises a plurality of displaceable components (7; 10), the at least one elastic device (20) comprises a corresponding plurality of elastic devices (20) associated with the displaceable components (7; 10), and the electrically conductive strip (25) is positioned so as to ensure simultaneous grounding of the displaceable components (7; 10).

19. A cowling for a bypass turbojet engine according to claim 1, wherein the thrust reverser is a scoop-door thrust reverser having a door (15) mounted on a pivot (17) and wherein the elastic device (20) is mounted on a side of the door (15) and upstream of the pivot (17).

* * * * *

UNITED STATES PATENT AND TRADEMARK OFFICE
CERTIFICATE OF CORRECTION

PATENT NO. : 6,237,325 B1  
DATED : May 29, 2001  
INVENTOR(S) : Hogie et al.

Page 1 of 1

It is certified that error appears in the above-identified patent and that said Letters Patent is hereby corrected as shown below:

Column 2,
Line 43, "One to" should read -- One of --.

Column 4,
Line 10, "II" should read -- 11 --.

Column 5,
Line 2, "rielative" should read -- relative --;
Line 32, "electrically-rounding" should read -- electrically grounding --.

Signed and Sealed this

Twenty-ninth Day of October, 2002

Attest:

Attesting Officer

JAMES E. ROGAN
Director of the United States Patent and Trademark Office